Patented Mar. 3, 1936

2,032,539

UNITED STATES PATENT OFFICE 2,032,539

PRODUCTS OF THE ANTHRAPYRIMIDINE SERIES

Max Albert Kunz, Mannheim, and Karl Koeberle and Otto Schlichting, Ludwigshafen-on-the-Rhine, Germany, assignors to General Aniline Works, Inc., New York, N. Y., a corporation of Delaware No Drawing. Application July 7, 1932, Serial No. 621,302. In Germany July 14, 1931

10 Claims. (Cl. 260—32)

The present invention relates to new dyestuffs of the anthrapyrimidine series and process of producing the same.

We have found that anthrapyrimidines of which the unsubstituted body corresponds to the formula:

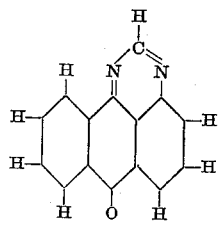

to which is connected an unsaponifiable group —X—R, wherein X denotes the group —NH— in which the hydrogen atom may be replaced by a low alkyl radicle, such as methyl, ethyl or propyl, —O— or —S—, and in which R denotes an organic radicle, are valuable dyestuffs which may be used for dyeing from the vat, for example cotton, or directly, for example artificial silk and wool in case they contain a group, such as a sulphonic acid group, which makes them water soluble.

The said new class of dyestuffs can be obtained by different methods. A convenient method consists in condensing an amino, hydroxy or mercapto derivative of an anthrapyrimidine with an organic compound containing a negative substituent, that is to say a halogen atom or a nitro group, in an unsaponifiable combination. The said organic compounds comprise, for example, halogen and nitro compounds of the aliphatic series, such as halogen alkyls, for example methyl- or ethyl chloride, propyl- or butyl iodides, cetyl iodide and the like. Also the halides of the olefinic series may be used for condensation, for example ethylene chloride, further the halides of the cycloaliphatic series, for example bromcyclohexane, dibromcyclohexane and homologues thereof. Particularly suitable for the said condensation are aromatic compounds containing halogen or a nitro group attached to the nucleus, for example those derived from benzene and naphthalene and their homologues, anthracene, phenanthrene, anthraquinone, benzanthrone, dibenzanthrones, the various dianthrones, such as ms-naphthodianthrone, allo-ms-naphthodianthrone, anthanthrone, pyranthrone, dibenzpyrenequinones, acridine, acridone, anthraquinonebenzacridone, anthraquinonethioxanthone, benzanthronepyrazolanthrone, anthrapyrimidine, anthrapyridone and anthrapyrimidone. Substitution products of the aforesaid negatively substituted organic compounds may be used as well, for example their alkyl, aryl and acylamino derivatives or such as contain a cyano, thiocyano or a substituted amino or mercapto group, or a carboxylic or sulphonic acid group which may be esterified. The same substituents may also be present in the anthrapyrimidine besides the amino, mercapto- or hydroxy group entering into reaction. Such substituents may also be present in the Py-C position of the anthrapyrimidines, thus an alkyl or a phenyl group may be in the said position which substituents can be introduced in the said position by using other monocarboxylic acid amides than formamide in the preparation of the anthrapyrimidine used as initial material, such as for example acetamide, propionamide or benzamide or substitution products thereof. Such of the aforesaid condensing components as contain more than one negative substituent may be condensed with one or more molecular proportions of anthrapyrimidine or its substitution products containing an amino, hydroxy or mercapto group, or in case the anthrapyrimidine contains several of the said groups it may be condensed with several molecular proportions of the said negatively substituted organic compounds. In these latter cases it is not necessary to use several molecular proportions of the same condensing component, but different components may be used whereby sometimes dyestuffs are obtained producing particularly valuable shades. Thus an anthrapyrimidine containing two amino groups or one amino group and one hydroxy or mercapto group may be condensed with one molecular proportion of an aliphatic and one molecular proportion of an aromatic halogen compound, or tetrabrompyranthrone may be condensed with from 1 to 4 molecular proportions of a monoaminoanthrapyrimidine, or with from 1 to 3 molecular proportions of a monoaminoanthrapyrimidine and from 1 to 3 molecular proportions of another amine, for example aminoanthraquinone. Instead of free amines of anthrapyrimidines also their monoalkyl amines may be used for condensation, for example monomethyl- or- monoethyl-aminoanthrapyrimidines. Likewise instead of the free hydroxy- or mercapto-anthrapyrimidines their metal compounds, in particular their alkali metal and alkaline earth metal compounds, may be used for condensation. As already pointed out only organic compounds containing a negative substituent in an unsaponifiable combination are to be used for the condensation according to our invention, consequently acid halides which are saponifiable to form acids, are not to be employed.

A further method of producing the new class of dyestuffs consists in condensing anthrapyrimidines containing a negative substituent attached to the nucleus with organic compounds containing an amino or a monoalkylamino, a hydroxy or mercapto group. Also for this condensation metal compounds, in particular alkali metal and alkaline earth metal compounds, of the hydroxy and mercapto compounds may be used. All organic compounds which as stated above are used in the form of their halogen and nitro substitution products for condensation with anthrapyrimidines containing an amino, hydroxy or mercapto group to produce the new dyestuffs, can be employed in the form of their amino, hydroxy and mercapto substitution products for the condensation with anthrapyrimidines containing a negative substituent connected to the nucleus and yield the same final products. Also in this condensation the components may contain any substituent which as stated above may be present in the components of the condensation process described first.

Both condensation processes are preferably carried out in inert organic diluents of high boiling point, for example nitrobenzene, chlorobenzenes, naphthalene and the like, and in the presence of acid-binding agents, such as alkali metal and alkaline earth metal carbonates and acetates, alkaline earth metal oxides, pyridine, quinoline and tertiary bases, for example dimethylaniline. The condensation may, however, also be carried out in aqueous suspension or in the absence of any diluent. The condensation can be accelerated by the addition of condensing catalysts, for example metals and metal compounds, such as iron, copper and their compounds, such as their oxides, acetates and carbonates.

A third method of producing the new class of dyestuffs consists in first carrying out the aforedescribed condensations with alpha-amino anthraquinones containing either a negative substituent, or a further amino, or hydroxy or mercapto group, instead of with the corresponding anthrapyrimidines, and then forming the pyrimidine ring. The pyrimidine ring is formed by acting on the said condensation products with a monocarboxylic acid amide, such as for example formamide, whereby the pyrimidine ring proper is formed, or with homologues of formamide, such as acetamide and propionamide, or with aromatic monocarboxylic acid amides, such as benzamide. When employing other acid amides than formamide for the formation of the pyrimidine ring, anthrapyrimidines substituted on the Py-C atom are produced, for example Py-C-alkyl and Py-C-aryl-anthrapyrimidines. When preparing the new class of compounds by this latter method it is often advantageous not to start with anthraquinones containing a free amino group in alpha position besides another amino group or a hydroxy or mercapto group entering into reaction with the negatively substituted organic compound, but to prevent the said amino group in alpha position to take part in the condensation by acylation, and to saponify the acylamino group after the condensation and only then form the pyrimidine ring in the manner described. The same precaution is sometimes also to be taken when starting from alpha-amino-anthraquinones containing a negative substituent and condensing it with amino, hydroxy or mercapto compounds.

A fourth method of producing the new compounds consists in stabilizing anthrapyrimidones containing an organic radicle attached thereto in an unsaponifiable combination by means of an imino group, an oxygen or a sulphur atom in their enolic form by esterification or etherification. The said anthrapyrimidones may be prepared in exactly the same manner as described above with respect to anthrapyrimidines by condensation of aminoanthrapyrimidones with negatively substituted organic compounds of the kind in question, or of negatively substituted anthrapyrimidones with organic amines, hydroxy or mercapto compounds. Esterification may be effected by the usual methods, for example by treating anthrapyrimidones containing an organic radicle attached thereto by means of an imino group or an oxygen or sulphur atom with agents capable of replacing an oxygen atom or a hydroxy group by halogen, for example the halides of phosphorus, such as phosphorus pentachloride, trichloride, tribromide, thionyl chloride, antimony and arsenic pentachloride and benzo trichloride. Other acid halides may also be used for esterification, for example benzoyl chloride. Etherification can be effected, for example, by treating the said condensed anthrapyrimidones with alkyl sulphates, in particular dimethylsulphate, esters of arylsulphonic acids, for example benzene sulphonic esters, in particular toluene sulphonic esters, and alkyl halides. This latter method is very convenient for the production of products of the new class which are substituted on the Py-C atom.

A further method for the production of the new compounds consists in acting on anthraquinone-1(N)-2-oxazoles containing an organic radicle attached thereto in an unsaponifiable combination by means of an imino group, or an oxygen or sulphur atom with ammonia, whereby the pyrimidine ring is formed. This conversion is best carried out by acting on the said anthraquinone-1(N)-2-oxazoles with strong aqueous ammonia in an autoclave at temperatures above 100° C.

The new compounds prepared by any of the aforedescribed methods can be subjected to halogenation by conventional methods, whereby often dyestuffs are obtained which are improved as regards the shades obtained therewith and the fastness properties. Halogenation may be carried out in the absence of any solvent or in an inorganic diluent, such as water, sulphuric acid, oleum, chlorsulphonic acid and phosphoric acid, or in an organic diluent, for example aromatic diluents of high boiling point, such as nitrobenzene, halogenbenzenes, naphthalene. The usual halogenation catalysts, such as metals, for example iron, copper and antimony, or their salts, for example their halides, or non-metals, such as iodine, sulphur and phosphorus may advantageously be added.

The new products may further be subjected to nitration or sulphonation. By sulphonation the products become water-soluble and thus suitable for use as wool dyestuffs. Sulphonation is preferably effected by means of sulphuric acid or oleum. For sulphonation by means of concentrated sulphuric acid it is sufficient to heat to temperatures up to about 100° C. Nitration can be effected by means of concentrated nitric acid, or preferably by means of a mixture of nitric acid and sulphuric acid, or by means of nitric acid in an organic diluent, such as nitrobenzene.

The new compounds may also be subjected to a further condensation, whereby products having carbazol, acridone or acridine structure or higher condensed ring systems are produced. As condensing agents those of an acid or alkaline nature may be used, for example caustic alkalies, alcoholic caustic alkalies, barium oxide, or aluminium chloride, sulphuric acid, oleum, chlorsulphonic acid or phosphorus pentachloride. Thus, the condensation product of an aminoanthrapyrimidine and 6-chlorobenzanthrone may be subjected to alkali fusion, whereby a condensation product is obtained having probably dibenzanthrone structure to which two anthrapyrimidine radicals are attached by means of imino groups. When subjecting condensation products containing an aromatic radicle attached by means of an imino group to an anthrapyrimidine radicle to the condensing action of sulphuric acid or aluminium chloride carbazolization takes place. Further, when acting with an acid condensing agent, such as chlorsulphonic acid or phosphorus pentachloride, on condensation products in which an anthrapyrimidine radical is connected by means of an imino group to an aromatic radical containing a carboxylic acid or an esterified carboxylic acid group in ortho position to the imino group, and in which condensation products the ortho position in the anthrapyrimidine radical is free, products are obtained having acridone structure. For the preparation of these more highly condensed products the third of the above described methods is particularly suitable and may be carried out, for example, by first condensing an alpha-aminoanthraquinone containing a further amino group with a negatively substituted aromatic compound, effecting one of the aforedescribed further condensations, and then forming the pyrimidine ring by acting on the condensed product with an amide of a monocarboxylic acid.

The following examples will further illustrate the nature of this invention but the invention is not restricted to these examples. The parts are by weight.

Example 1

5 parts of 5-amino-1,9-anthrapyrimidine (obtainable by the saponification of the 5-benzoylamino-1.9-anthrapyrimidine obtainable from 1-amino-5-benzoylaminoanthraquinone by treatment with formamide) are heated to boiling in 100 parts of nitrobenzene with 5 parts of alpha-chloranthraquinone, 0.5 part of copper oxide and 5 parts of sodium acetate until the formation of dyestuff is completed. The whole is then filtered by suction while hot, the filter cake washed with hot nitrobenzene and alcohol and boiled with dilute hydrochloric acid, washed until neutral and dried. The dyestuff, obtained in a good yield, is a dark violet powder which dissolves in concentrated sulphuric acid giving a green coloration and which dyes cotton fast violet-red shades from a brown-red vat.

The same dyestuff is obtained by condensing 5-brom-1.9-anthrapyrimidine (obtainable from 5-amino-1,9-anthrapyrimine by diazotization and treatment of the diazo compound with cuprous bromide) with alpha-aminoanthraquinone.

Brown-red dyestuffs having a violet tinge are obtained by employing beta-chlor- or beta-aminoanthraquinone instead of the alpha-chlor- or alpha-amino-anthraquinone. The color of the solutions of these dyestuffs in concentrated sulphuric acid is green-blue.

Example 2

100 parts of 4-amino-1,9-anthrapyrimidine are heated to boiling while stirring in 2000 parts of naphthalene after the addition of 100 parts of potash, 2 parts of copper oxide and 98 parts of dibrom-3,4,8,9 - dibenzpyrene-5,10-quinone until unchanged initial material can no longer be detected, which is usually the case after several hours. The reaction mixture is then worked up in the usual manner. The reaction product obtained in crystalline form dissolves in concentrated sulphuric acid giving a violet coloration and yields brown dyeings from a brown-red vat.

4-amino-1,9-anthrapyrimidine may also be condensed with other halogen compounds, as for example with dibrom-anthanthrone, dibrom-allo-ms-naphthodianthrone or 4-chlor - Bz - 3,5-trichloranthraquinone-2,1-benzacridone.

Example 3

7 parts of 2,6-dichloranthraquinone are boiled for 15 hours while stirring in 250 parts of nitrobenzene with 12.5 parts of 5-amino-1,9-anthrapyrimidine, 3 parts of copper oxide and 10 parts of sodium acetate. The whole is then filtered by suction while hot, the reaction product washed with hot nitrobenzene and alcohol, boiled with dilute hydrochloric acid, washed until neutral and dried. The dyestuff, which is a dark red-brown powder, dissolves in concentrated sulphuric acid giving a green coloration and dyes cotton very fast Bordeaux red shades from a brown-red vat.

If instead of employing 12.5 parts of 5-amino-1,9-anthrapyrimidine (as described in the foregoing paragraph), only 6.3 parts thereof together with 11.7 parts of aminodibenzanthrone be employed for the condensation described in the foregoing paragraph, a black dyestuff powder is obtained which dissolves in concentrated sulphuric acid giving a red-violet coloration and which dyes cotton gray to black shades of good fastness from a blue hydrosulphite vat.

The condensation product obtained from 2,7-dichloranthraquinone and 2 molecular proportions of 5-amino-anthrapyrimidine in a similar manner dissolves in concentrated sulphuric acid giving a green coloration and dyes vegetable fibres very fast red-violet shades from a red vat. The dyestuff derived from 2,7-dichloranthraquinone and 1 molecular proportion of 5-amino-1,9-anthrapyrimidine and 1 molecular proportion of aminodibenzanthrone yields fast blue-gray dyeings on cotton from a blue vat.

Blue-violet dyestuffs are obtained by the condensation of 1,5-dichloranthraquinone with 2 molecular proportions of 5-amino-1,9-anthrapyrimidine, while the dyestuff derived from 1,5-dichloranthraquinone and 1 molecular proportion of 5-amino-1,9-anthrapyrimidine and 1 molecular proportion of aminodibenzanthrone yields very fast blue-green dyeings. Similar dyeings are obtained when employing the condensation products derived from 1,8-dichloranthraquinone instead of from 1,5-dichloranthraquinone.

Example 4

10 parts of 5-chlor-1,9-anthrapyrimidine are heated for 4 hours at from 180° to 185° C. with 100 parts of paratoluidine. The violet colored reaction product is then poured into dilute hydrochloric acid, the deposited condensation product is filtered off by suction, washed until neutral and dried. The dark violet powder thus obtained dissolves in concentrated sulphuric acid giving a green coloration. It dissolves in organic solvents giving a violet coloration. Acetate silk is dyed blue-violet shades thereby from a soap bath. By sulphonating the condensation product with anhydrous sulphuric acid at from 60° to 80° C., a dyestuff is obtained which dyes wool beautiful blue-violet shades.

Other aromatic amines, as for example naphthylamines, may be employed instead of paratoluidine.

Example 5

5 parts of 5-amino-1,9-anthrapyrimidine are heated in 100 parts of naphthalene with 6.5 parts of 4-chlor-1-benzoylaminoanthraquinone, 0.5 part of cuprous chloride and 5 parts of anhydrous sodium acetate until the reaction product is practically free from chlorine. By working up in the usual manner, the dyestuff is obtained in the form of a dark violet powder which dissolves in concentrated sulphuric acid giving a green coloration and which dies cotton fast blue-violet shades from a red vat.

If 5-chlor-1-benzoylaminoanthraquinone be employed instead of 4-chlor-1-benzoylaminoanthroquinone, a dark brown reaction product is obtained which dissolves in concentrated sulphuric acid giving a yellow-green coloration and which dyes cotton brown shades from a brown-red vat.

Example 6

A mixture of 12.5 parts of 5-amino-1,9-anthrapyrimidine, 11.6 parts of dibromanthanthrone, 3 parts of copper oxide, 12 parts of sodium acetate and 250 parts of naphthalene is heated to boiling for 15 hours while stirring. The reaction mixture is filtered by suction while hot and the residue is washed with hot toluene and worked up in the usual manner. The reaction product is a dark blue powder which dissolves in concentrated sulphuric acid giving a green coloration and which dyes cotton very fast blue shades from a Bordeaux red vat.

If the 12.5 parts of 5-amino-1,9-anthrapyrimidine be replaced by a mixture of 5.5 parts of alpha-aminoanthraquinone and 6.2 parts of 5-amino-1,9-anthrapyrimidine, a dark blue dyestuff powder is obtained which dissolves in concentrated sulphuric acid giving a green coloration and which dyes cotton very fast blue shades from a violet tinged red vat. A similar dyestuff is obtained by replacing the alpha-amino-anthraquinone by beta-aminoanthraquinone.

Example 7

5 parts of 2-amino-1,9-anthrapyrimidine are boiled for several hours while stirring in 100 parts of naphthalene after the addition of 5 parts of beta-chloranthraquinone, 5 parts of potash and 1 part of copper oxide. After diluting with butyl alcohol, toluene or monochlorbenzene, the reaction product is filtered off by suction and worked up in the usual manner. It is a brown-red powder which dissolves in concentrated sulphuric acid giving a blue-green coloration and which yields fast red-brown dyeings.

Instead of beta-chloranthraquinone, other halogenanthraquinones or halogen derivatives of series of high molecular weight may be brought into reaction with 2-amino-1,9-anthrapyrimidine.

Example 8

A suspension of 11.6 parts of dibromanthanthrone, 6.2 parts of 5-amino-1,9-anthrapyrimidine, 2 parts of copper oxide and 12 parts of sodium acetate in 250 parts of nitrobenzene is first heated to boiling for 5 hours while stirring. 11.8 parts of aminodibenzanthrone are then added and the whole further heated until the formation of dyestuff is completed. After working up in the usual manner the dyestuff is obtained in the form of a blue-black powder which dissolves in concentrated sulphuric acid giving a brown-violet coloration and which dyes cotton very fast green-blue shades from a violet vat.

Example 9

9 parts of tetrabrompyranthrone are heated to boiling while stirring in 200 parts of nitrobenzene with 12.5 parts of 5-amino-1,9-anthrapyrimidine, 2 parts of copper oxide and 12 parts of sodium acetate until the formation of dyestuff is completed. The mixture is then worked up in the usual manner. The dyestuff, obtained in a quantitative yield, is a dark violet powder which dissolves in concentrated sulphuric acid giving a green coloration and which dyes cotton very fast violet-tinged gray to violet-black shades from a violet-red vat.

If the 12.5 parts of 5-amino-1,9-anthrapyrimidine be replaced by a mixture of 11.8 parts of aminodibenzanthrone and 6.2 parts of 5-amino-1,9-anthrapyrimidine, the reaction product obtained is a black dyestuff powder which dissolves in concentrated sulphuric acid giving a violet coloration and which dyes cotton extremely fast gray to black shades from a violet vat.

Bluish-gray to black dyeings are obtained by employing the condensation product obtained by using instead of 12.5 parts of 5-amino-1,9-anthrapyrimidine (as described in the first paragraph of the present example) a mixture of 5.9 parts of aminodibenzanthrone and 9.3 parts of 5-amino-1,9-anthrapyrimidine.

The dyestuff obtainable by replacing in the reaction described in the first paragraph of the present example the 12.5 parts of 5-amino-1,9-anthrapyrimidine by a mixture of 17.5 parts of aminodibenzanthrone and 3.1 parts of 5-amino-1,9-anthrapyrimidine yields darker gray to black dyeings.

Example 10

A mixture of 12.5 parts of 5-amino-1,9-anthrapyrimidine, 15.4 parts of dibromdibenzanthrone, 2 parts of copper oxide, 12 parts of sodium acetate and 200 parts of naphthalene is heated to boiling for 15 hours while stirring and then worked up in the usual manner. A dark blue dyestuff powder is obtained which dissolves in concentrated sulphuric acid giving a violet coloration and which dyes cotton fast gray-blue shades from a Bordeaux red vat.

In the same manner a dyestuff is obtained from dibromdibenzanthrone and 1 molecular proportion of 5-amino-1,9-anthrapyrimidine and 1 molecular proportion of aminodibenzanthrone. It is a dark blue powder which dissolves in concentrated sulphuric acid giving a violet coloration and which dyes cotton fast green-blue shades from a reddish-navy blue vat.

Example 11

15.4 parts of dibromisodibenzanthrone are heated to boiling while stirring in 300 parts of nitrobenzene with 12.5 parts of 5-amino-1,9-anthrapyrimidine, 2 parts of copper oxide and 12 parts of sodium acetate until the reaction product is practically free from bromine. The reaction mixture is then filtered by suction while hot, the condensation product washed with hot nitrobenzene and alcohol, boiled with dilute hydrochloric acid, washed until neutral and dried. The dark blue dyestuff powder, which is obtained in a quantitative yield, dissolves in concentrated sulphuric acid giving a green coloration and dyes cotton very fast reddish navy blue shades from a violet vat.

The dyestuff obtainable in the same manner from dibromisodibenzanthrone with 1 molecular proportion of 5-amino-1,9-anthrapyrimidine and 1 molecular proportion of aminodibenzanthrone is also a dark blue powder which dissolves in concentrated sulphuric acid giving a brown-violet coloration and which dyes cotton fast blue shades from a blue vat.

If the aminodibenzanthrone be replaced by alpha-aminoanthraquinone, a dyestuff yielding blue dyeings is also obtained which dissolves in concentrated sulphuric acid giving a green coloration.

Example 12

10 parts of dibrom-3,4,8,9-dibenzpyrene-5,10-quinone are heated to boiling while stirring in 200 parts of nitrobenzene with 10 parts of 5-amino-1,9-anthrapyrimidine, 1 part of cuprous chloride and 10 parts of sodium acetate until the formation of the dyestuff is completed. After working up in the usual manner, the dyestuff is obtained in the form of a violet-black powder which dissolves in concentrated sulphuric acid giving a violet-red coloration and which dyes vegetable fibres fast gray to violet-black shades from a violet-tinged red vat.

Example 13

A mixture of 12.3 parts of dibrom-3,4,8,9-dibenzpyrene-5,10-quinone, 11.7 parts of aminodibenzanthrone, 6.2 parts of 5-amino-1,9-anthrapyrimidine, 1.2 parts of copper oxide, 12 parts of sodium acetate and 250 parts of naphthalene is heated to boiling while stirring until the reaction product is practically free from bromine. The reaction mixture is then worked up in the usual manner. The dyestuff obtained is a black powder which dissolves in concentrated sulphuric acid giving a violet-red coloration and which yields fast gray to black dyeings on vegetable fibres from a violet-red vat.

If alpha-aminoanthraquinone be employed instead of aminodibenzanthrone, a dyestuff is obtained which dissolves in concentrated sulphuric acid giving a red coloration having a violet tinge and which dyes cotton powerful dark violet shades from a Bordeaux red vat.

The dyestuff derived from dibrom-3,4,8,9-dibenzpyrene-5,10-quinone, 1 molecular proportion of 5-amino-1,9-anthrapyrimidine and 1 molecular proportion of beta-aminoanthraquinone dissolves in concentrated sulphuric acid giving a red-violet coloration and yields powerful violet-tinged gray dyeings on cotton from a red vat.

Example 14

66 parts of 2-amino-C-phenyl-1,9-anthrapyrimidine, 50 parts of 2-chloranthraquinone, 50 parts of calcined soda, 10 parts of copper oxide and 1000 parts of naphthalene are heated to boiling while stirring until no further separation of dyestuff takes place. The whole is then allowed to cool and is worked up in the usual manner. The reaction product, which is obtained in a very good yield in the form of small needles having a bronze lustre, dissolves in concentrated sulphuric acid giving a green-blue coloration and yields scarlet-red dyeings of very good fastness on cotton from a brown vat.

The corresponding condensation product with 1-chlor-4-benzoylaminoanthraquinone forms small violet needles, dissolves in concentrated sulphuric acid giving a green coloration and dyes cotton violet shades.

The condensation product with alpha-chloranthraquinone dyes cotton rose-red shades, that with 1-chlor-5-benzoylaminoanthraquinone dyes blue-red shades and that with dibromanthanthrone dyes violet-gray shades.

By causing 2-amino-C-phenyl-1,9-anthrapyrimidine to react with ½ molecular proportion of 2,6- or 2,7-dichloranthraquinone crystalline yellow-red reaction products are obtained.

If the said condensation product derived from 1-chlor-4-benzoylaminoanthraquinone be heated to from 180° to 200° C. in concentrated sulphuric acid for a short time, a carbazol derivative yielding brown dyeings is obtained.

Example 15

14.2 parts of dibrompyranthrone are heated to boiling while stirring in 300 parts of nitrobenzene with 12.5 parts of 5-amino-1,9-anthrapyrimidine, 0.2 part of copper oxide and 10 parts of sodium carbonate until the reaction product is practically free from bromine. The whole is then worked up in the usual manner. The dyestuff obtained, which is a black powder, dissolves in concentrated sulphuric acid giving a green-blue coloration and dyes cotton fast powerful olive-green shades from a red-violet vat.

A dyestuff which also yields fast olive-green shades is obtained in the same way from dibrompyranthrone by condensation with 1 molecular proportion of 5-amino-1,9-anthrapyrimidine and 1 molecular proportion of aminodibenzanthrone.

Example 16

20 parts of 5-amino-4'-benzoylamido-1,1'-anthrimidecarbazol (obtained by partial saponification by means of sulphuric acid at between 35° and 50° C. of 5,4'-dibenzoyldiamino-1,1'-anthrimidecarbazol) are heated to boiling for several hours with 100 parts of formamide in 200 parts of phenol. As soon as a sample yields yellow brown dyeings fast to chlorine, the reaction mixture is allowed to cool and the 4'-benzoylamino-5,10-pyrimidine-1,1'-anthrimidecarbazol formed filtered off. It is a brown crystalline powder, dissolves in concentrated sulphuric acid to give a red solution and dyes cotton from a brown vat strong yellow brown shades of very good fastness.

A brown dyeing benzoylaminoanthrapyrimidine derivative is obtained in an analogous manner from 5-amino-4'-benzoylamino-8-methoxy-1,1'-anthrimidecarbazol (obtained from 5,4'-dibenzoyldiamino-8-methoxy-1,1'-anthrimidecarbazol in a manner analogous to that described in the foregoing paragraph).

The reaction product obtained in an analogous manner from 5-amino-5'-benzoylamino-1,1'-anthrimidecarbazol dyes golden orange shades.

By condensation of alpha-aminoacylaminoanthrimides with formamide in an analogous manner the acylaminoanthrimidoanthrapyrimides are obtained as are also obtained the benzoylaminopyridinoanthrapyrimidines by the action of the formamide on alphaaminobenzoylaminopyridinoanthraquinones.

In the same manner by the action of formamide on other alpha-amino derivatives of anthraquinones, anthraquinoneacridones, anthraquinonecarbazols, anthraquinonethiazols and anthraquinoneazines, the corresponding anthrapyrimidine derivatives are obtained.

Example 17

50 parts of the condensation product obtainable from 1,4-chlorbenzoylaminoanthraquinone according to Example 14 are stirred in 500 parts of concentrated sulphuric acid at from 30° to 40° C. until a sample withdrawn gives green-gray dyeings on cotton in contrast to the initial material which yields scarlet-red dyeings. The reaction mixture is then allowed to cool and is worked up in the usual manner. The reaction product dissolves in concentrated sulphuric acid giving a green coloration and yields a green-blue vat.

Example 18

5 parts of 5-chlor-1, 9-anthrapyrimidine and 5 parts of 3-hydroxypropylamine are heated to boiling for 2 hours in 50 parts of ortho-dichlorbenzene. After cooling, the crystal pulp is filtered by suction, washed with a little dichlorbenzene and alcohol and dried. The condensation product obtained, viz. 5-(3-hydropropylamino)1, 9-anthrapyrimidine, is a red-violet crystal powder which dissolves in concentrated sulphuric acid giving a yellow solution and which dyes acetate silk powerful Bordeaux red shades.

Similar dyestuffs are obtained by employing other hydroxyalkylamines, such as hydroxyethylamine and 3-hydroxy-butylamine.

Example 19

A mixture of 9 parts of tetrabrompyranthrone, 6.2 parts of 5-amino-1, 9-anthrapyrimidine, 11.8 parts of amino-benzanthronepyrazolanthrone, 2 parts of copper oxide, 12 parts of sodium acetate and 250 parts of naphthalene is heated to boiling while stirring until the reaction product is practically free from bromine. The reaction mixture is then filtered by suction while hot and worked up in the usual manner. The dyestuff obtained is a black powder which dissolves in concentrated sulphuric acid giving a dirty green coloration and which dyes cotton powerful gray shades from a violet vat.

If, instead of tetrabrompyranthrone, an equivalent amount of dibrom-3, 4, 8, 9-dibenzpyrene-5, 10-quinone be employed, a black dyestuff powder is also obtained which dissolves in concentrated sulphuric acid giving a brown-violet coloration and which likewise dyes cotton gray shades from a violet-tinged red vat.

Example 20

15.2 parts of dibrombenzanthronepyrazolanthrone are heated to boiling while stirring in 250 parts of naphthalene with 12.5 parts of 5-amino-1, 9-anthrapyrimidine, 2 parts of copper oxide and 12 parts of sodium acetate until the condensation is practically free from bromine. The dyestuff is worked up in the usual manner. It is a black powder which dissolves in concentrated sulphuric acid giving a green coloration and which dyes cotton blue-gray shades from a green vat.

The dyestuff derived from dibrombenzanthronepyrazolanthrone, 1 molecular proportion of 5-aminoanthrapyrimidine and 1 molecular proportion of aminodibenzanthrone dissolves in concentrated sulphuric acid giving a brown-violet coloration and yields fast green-blue dyeings on cotton from a blue vat.

Example 21

24.7 parts of 5-amino-1, 9-anthrapyrimidine, 26.5 parts of 6-chlorbenzanthrone, 500 parts of nitrobenzene, 3 parts of copper oxide and 25 parts of sodium acetate are boiled for several hours while stirring and then worked up in the usual manner. The reaction product obtained, which is in the form of violet needles, dissolves in concentrated sulphuric acid giving an olive-green coloration.

20 parts of this condensation product at a temperature of 130° C. are introduced while stirring into a melt of 200 parts of caustic potash and 160 parts of alcohol and heated at from 145° to 150° C. until unchanged initial material can no longer be detected. The melt is then taken up with water, blown with air and the dyestuff filtered off by suction. It is a black powder which yields gray to black dyeings of very good fastness from a brown-violet vat.

A reaction product yielding gray to black dyeings is obtained in an analogous manner from the condensation product derived from Bz 1-pyrazolanthronyl-6-brombenzanthrone and 5-aminoanthrapyrimidine by fusion with alcoholic potash.

Example 22

A mixture of 12.5 parts of 5-amino-1, 9- anthrapyrimidine, 13.5 parts of 5-chlor-1, 9-anthrapyrimidine (obtainable by heating 5-chlor-1-aminoanthraquinone with formamide or from 5-amino-1, 9-anthrapyrimidine by way of the diazo compound), 2 parts of copper oxide, 12 parts of sodium acetate and 200 parts of naphthalene is heated to boiling for 10 hours while stirring. The reaction product is filtered off by suction while hot, washed with hot toluene, boiled with dilute hydrochloric acid, again filtered by suction, washed until neutral and dried. The dyestuff obtained in quantitative yield is a violet powder which dissolves in concentrated sulphuric acid giving a green coloration and which dyes cotton fast blue-violet shades from a dark red hydrosulphite vat.

Example 23

92 parts of dibromanthanthrone are boiled while stirring in 2000 parts of naphthalene after the addition of 100 parts of calcined sodium carbonate, 2 parts of copper oxide and 100 parts of 8-amino-1, 9-anthrapyrimidine until the reaction product is practically free from bromine. The reaction mixture is then allowed to cool and is worked up in the usual manner. The condensation product obtained is a black powder which dissolves in concentrated sulphuric acid giving a gray coloration, and which dyes cotton extremely fast gray shades from a brown-violet vat.

The condensation product derived from tetrabrompyranthrone and 8-amino-1, 9-anthrapyrimidine, similarly to that from dibrom-3, 4, 8, 9- dibenzpyrene-5,10-quinone, yields violet gray dyeings.

If 1 molecular proportion of tetrabrompyranthrone be condensed with 3 molecular proportions of aminodibenzanthrone and 1 molecular proportion of 8-amino-1,9-anthrapyrimidine, a reaction product yielding deep black dyeings is obtained.

The imine derived from 4-brom-N-methyl-1,9-anthrapyridone and 8-amino-1,9-anthrapyrimidine yields violet dyeings.

If instead of 8-amino-1,9-anthrapyrimidine, homologues thereof be employed, dyestuffs having similar properties as regards fastness are obtained.

In a similar manner other amino-1,9-anthrapyrimidines, as for example 7-amino-, 6-amino-, 3-amino- or 2-amino-1,9-anthrapyrimidine, may be employed for the said condensation reaction.

If, instead of 8-amino-1,9-anthrapyrimidine, an amino-anthrapyrimidine obtained by nitrating 1,9-anthrapyrimidine and reducing the nitro compound thus formed be employed a vat dyestuff which likewise yields gray dyeings is obtained.

*Example 24*

20 parts of 5-chlor-1,9-anthrapyrimidine which has been dissolved and reprecipitated from concentrated sulphuric acid, are heated for 10 hours at from 150° to 160° C. in an autoclave with 100 parts of 25 per cent solution of methylamine and 1 part of copper acetate. The reaction product is filtered off by suction when cold, washed with water and dried. It is a violet crystal powder which dissolves in concentrated sulphuric acid forming a green-yellow solution and which dyes acetate silk bluish rose-red shades.

If dichlor-1,9-anthrapyrimidine (obtainable by chlorinating 5-chlor-1,9-anthrapyrimidine with chlorine in trichlorbenzene at the boiling temperature in the presence of iodine) be treated with methylamine in the said manner, a dark violet reaction product is obtained which dissolves in concentrated sulphuric acid giving a green-blue coloration and which dyes acetate silk rose-red shades.

*Example 25*

10 parts of brom-5-amino-1,9-anthrapyrimidine (obtainable by treating 5-amino-1,9-anthrapyrimidine with bromine in chlorsulphonic acid in the presence of iodine at from 65° to 70° C.) are heated in an autoclave with 100 parts of a 50 per cent aqueous methylamine solution at from 130° to 140° C. for 8 to 10 hours. On working up the reaction mixture in the usual manner a dark violet powder is obtained which dissolves in concentrated sulphuric acid giving a green coloration and which dyes acetate silk brown-violet shades.

*Example 26*

10 parts of 5-chlor-nitro-1,9-anthrapyrimidine (obtainable by nitrating 5-chlor-1,9-anthrapyrimidine dissolved in concentrated sulphuric acid with concentrated nitric acid) are heated with 50 parts of a 20 per cent solution of methylamine in an autoclave at from 140° to 150° C. for 10 hours. The reaction product, worked up in the usual manner, is a violet powder which dissolves in concentrated sulphuric acid giving an olive-green coloration and which dyes acetate silk violet shades.

*Example 27*

38 parts of Bz 1,6-dibrombenzanthrone are heated to boiling for 3 hours while stirring in 300 parts of nitrobenzene after the addition of 13 parts of potash and 23 parts of alpha-aminoanthraquinone. The reaction mixture is then allowed to cool to 80° C., 25 parts of 5-amino-1,9-anthrapyrimidine, 30 parts of potash and 3 parts of copper oxide are added, the whole is boiled for from 10 to 12 hours and then worked up in the usual manner. The reaction product obtained is introduced at from 130° to 140° C. into a melt of 200 parts of caustic potash in 200 parts of alcohol, the whole heated at 145° C. for several hours, taken up with water while hot, blown with air and filtered by suction. The dyestuff obtained yields extremely fast gray dyeings from a brown-violet vat.

Instead of 23 parts of alpha-aminoanthraquinone, 25 parts of pyrazolanthrone may be employed for the condensation; in this manner a dyestuff is obtained which likewise yields gray dyeings.

*Example 28*

6 parts of dichlor-1,9-anthrapyrimidine (obtainable by the chlorination of 5-chlor-1,9-anthrapyrimidine with chlorine in the presence of iodine and in trichlorbenzene as the solvent at the boiling temperature) are heated to boiling while stirring with 9.4 parts of aminodibenzanthrone, 4.9 parts of 5-amino-1,9-anthrapyrimidine, 2 parts of copper oxide and 9 parts of sodium acetate in 100 parts of nitrobenzene for 8 hours, the reaction mixture then being worked up in the usual manner. A violet-brown dyestuff powder is obtained in a quantitative yield. It dissolves in concentrated sulphuric acid giving a dirty violet coloration and dyes cotton gray-blue shades from a blue vat.

The dyestuff derived from dichlor-1,9-anthrapyrimidine with 1 molecular proportion of alpha- and 1 molecular proportion of beta-aminoanthraquinone is a dark violet powder which dissolves in concentrated sulphuric acid giving a green coloration and which dyes cotton currant shades.

*Example 29*

A suspension of 20 parts of 1-amino-4-brom-anthraquinone-2-sulphonic acid, 12.5 parts of 5-amino-1,9-anthrapyrimidine, 12 parts of sodium acetate and 1 part of cuprous chloride in 150 parts of water is heated for 10 hours to from 150° to 160° C. in an autoclave. The solution is filtered by suction from the residue, the latter washed well with water and the dyestuff is then recovered from the filtrate in the form of a violet crystalline precipitate by salting out with common salt. The violet dyestuff powder dissolves in concentrated sulphuric acid giving a yellow coloration and dyes wool beautiful red-violet shades.

If 5-chlor-1,9-anthrapyrimidine be employed instead of 5-amino-1,9-anthrapyrimidine, a violet dyestuff powder is likewise obtained which dissolves in concentrated sulphuric acid giving a yellow coloration and which dyes cotton red-violet shades.

*Example 30*

A mixture of 6 parts of 1-mercapto-2-amino-anthraquinone, 6.2 parts of 5-amino-1,9-anthrapyrimidine, 6 parts of 5-brom-1,9-anthrapyrimidine, 6 parts of potassium carbonate and 100 parts of nitrobenzene is heated to boiling for 4 hours. The condensation product isolated in the usual manner is a blue dyestuff powder which dissolves in concentrated sulphuric acid giving a green coloration and which dyes cotton gray-blue shades from a red vat.

Example 31

37 parts of 5-chlor-1,9-anthrapyrimidine together with 10.5 parts of phenol, 0.1 part of copper powder, 0.4 part of copper acetate and 7.5 parts of potassium carbonate are heated to boiling in 200 parts of nitrobenzene for 4 hours while stirring. The reaction mixture is worked up in the usual manner and the reaction product is obtained in the form of a dark brown powder. By a single crystallization from trichlorbenzene the dyestuff is obtained in the form of pale brown small needles which dissolve in concentrated sulphuric acid giving a yellow coloration.

If para-cresol be employed instead of phenol, a condensation product is obtained which crystallizes in the form of brown granules which dissolve in concentrated sulphuric acid to give a yellow coloration.

If salicyl aldehyde be employed instead of phenol, the condensation product, after crystallization, is also obtained in the form of pale brown small needles which dissolve in concentrated sulphuric acid giving an orange coloration.

Example 32

100 parts of 4-aminoanthraquinone-C-orthochlorphenyl-1,2-imideazole are heated to boiling while stirring in 200 parts of phenol with 200 parts of formamide until the initially violet reaction mixture has become yellow-brown. The reaction mixture is then allowed to cool and the precipitate filtered off. It dyes cotton from a brown vat yellow shades.

Example 33

8 parts of the condensation product described in the first paragraph of Example 6 are dissolved in 80 parts of chlorsulphonic acid and heated for 3 hours at between about 60 and 70° C. after the addition of 0.5 part of iodine, 0.5 part of sulphur and 4 parts of bromine. The reaction mixture is diluted with 100 parts of concentrated sulphuric acid and then poured onto ice. The separated dyestuff is filtered off. It forms a violet powder dissolving in concentrated sulphuric acid to give a green solution and dyes cotton from a violet-red vat violet shades.

Example 34

3 parts of the condensation product obtainable according to Example 22 are heated to boiling in 60 parts of trichlorobenzene with 0.3 part of iodine, while passing a current of chlorine for 2 hours through the reaction mixture. After cooling, the reaction mixture is filtered and the filter cake worked up in the usual manner. The product is a dark brown powder dissolving in concentrated sulphuric acid to give a yellow brown solution.

Example 35

8 parts of the condensation product described in the first paragraph of Example 1 are dissolved in 80 parts of chlorsulphonic acid and heated for 3 hours at between about 60 and 70° C. after the addition of 0.5 part of iodine, 0.5 part of sulphur and 4 parts of bromine. The reaction mixture is diluted with 100 parts of concentrated sulphuric acid and then poured onto ice. The separated dyestuff is filtered off. It forms a violet powder dissolving in concentrated sulphuric acid to give an olive green solution and dyes cotton from a red brown vat violet brown shades.

Example 36

25 parts of 1,9-anthrapyrimidone are heated while stirring at between 140 and 150° C. with 22 parts of phosphorus pentachloride until phosphorus oxychloride does not any more escape. After cooling, the reaction product is taken up with water, the precipitate filtered off and dried. The Py-C-chlor-1,9-anthrapyrimidine thus obtained crystallizes in yellow needles, dissolves in concentrated sulphuric acid to give a golden yellow solution and furnishes an orange-red vat.

26 parts of the product thus obtained are heated to boiling for several hours in 500 parts of nitrobenzene after the addition of 35 parts of 1-amino-5-benzoylaminoanthraquinone. After completion of the reaction, the reaction mixture is worked up in the usual manner. The reaction product is an orange powder dissolving in concentrated sulphuric acid to give an orange solution and dyes cotton from a brown vat orange shades.

When using an equivalent amount of beta-aminoanthraquinone instead of 1-amino-5-benzoylaminoanthraquinone, a product is obtained dyeing cotton yellow shades.

What we claim is:

1. Anthrapyrimidines to which is connected an unsaponifiable group —X—R, wherein X denotes the group —NH— in which the hydrogen atom may be replaced by a low alkyl radical, —O— or S, and in which R denotes a radical of the aliphatic aromatic or heterocyclic series connected directly to X.

2. Anthrapyrimidines to which is connected an unsaponifiable group —X—R, wherein X denotes the group —NH— in which the hydrogen atom may be replaced by a low alkyl radical, —O— or S, and in which R denotes an aromatic radical.

3. Anthrapyrimidines to which is connected an unsaponifiable group —NH—R, wherein R denotes a radical of the aliphatic, aromatic or heterocyclic series connected directly to X.

4. Anthrapyrimidines to which is connected an unsaponifiable group —NH—R, wherein R denotes an aromatic radical.

5. Anthrapyrimidines to which is connected an unsaponifiable group —NH—R, wherein R denotes the radical of an aromatic compound containing a keto group.

6. Anthrapyrimidines to which is connected an unsaponifiable group —NH—R, wherein R denotes the radical of an aromatic compound capable of being vatted.

7. Anthrapyrimidines to which is connected an unsaponifiable group —NH—R, wherein R denotes the radical of an aromatic compound containing a system of more than 3 condensed rings and capable of being vatted.

8. The dyestuff corresponding to the formula

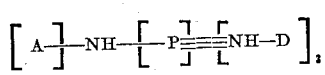

wherein A denotes the radical of an anthrapyrimidine, P denotes the radical of a pyranthrone, and D denotes the radical of a dibenzanthrone, which dyestuff forms a black powder dissolving in concentrated sulphuric acid to give a violet solution and dyes cotton from a violet vat gray to black shades.

9. The dyestuff corresponding to the formula:

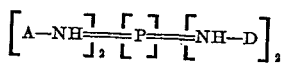

wherein A denotes the radical of an anthrapyrimidine, P denotes the radical of a pyranthrone, and D denotes the radical of a dibenzanthrone, which dyestuff forms a black powder dissolving in concentrated sulphuric acid to give a violet solution and dyes cotton from a violet vat gray to black shades.

10. The process of producing new compounds of the anthrapyrimidine series, which comprises condensing a compound A—X with a compound B—X wherein one X stands for a group selected from the class consisting of —NH$_2$, NH—alkyl, —OH and —SH, wherein the other X stands for halogen, A for an anthrapyrimidine radicle and B for a radicle of the aliphatic, aromatic or heterocyclic series connected directly to X.

MAX ALBERT KUNZ.
KARL KOEBERLE.
OTTO SCHLICHTING.